United States Patent [19]

Corwin

[11] 4,215,352

[45] Jul. 29, 1980

[54] INKING SYSTEM WITH SATURATION CONTROL MEANS FOR MULTI-PEN RECORDERS

[75] Inventor: William C. Corwin, La Grange, Ill.

[73] Assignee: Beckman Instruments, Inc., Fullerton, Calif.

[21] Appl. No.: 914,089

[22] Filed: Jun. 9, 1978

[51] Int. Cl.² .......................................... G01D 15/16
[52] U.S. Cl. .............................................. 346/140 R
[58] Field of Search ................................... 346/140 R

[56] References Cited

U.S. PATENT DOCUMENTS

| 3,386,102 | 5/1968 | Scheuzger et al. | 346/140 R |
| 3,401,401 | 9/1968 | Read et al. | 346/140 R |
| 4,038,667 | 7/1977 | Hou et al. | 346/140 R |

FOREIGN PATENT DOCUMENTS 762846  12/1956  United Kingdom ............... 346/140 R Primary Examiner—George H. Miller, Jr.

Attorney, Agent, or Firm—Robert J. Steinmeyer; Paul R. Harder; Frank J. Kowalski

[57] ABSTRACT

An ink priming system for a multi-pen recorder of the gravity-fed capillary tube type comprises a gas manifold common to all of the ink bottles individually provided for each channel of the recorder. Individual control valves may be selectively actuated by the operator to prime each pen. When the control valve is closed, the gas pressure is bled off so that the inking system thereafter acts as a normal gravity-fed capillary tube system. A non-clogging inking system is provided by utilizing a short length of flexible thin walled tubing to supply ink to the movable recording pen. The length of this tubing is sufficiently short that evaporation of the ink solvent through the walls of the tube is accompanied by diffusion of the dye back to the ink bottle so that the concentration of dye in the ink at the end of the tube adjacent the recording pen does not exceed saturation value during prolonged periods of non-use of the recorder.

9 Claims, 4 Drawing Figures

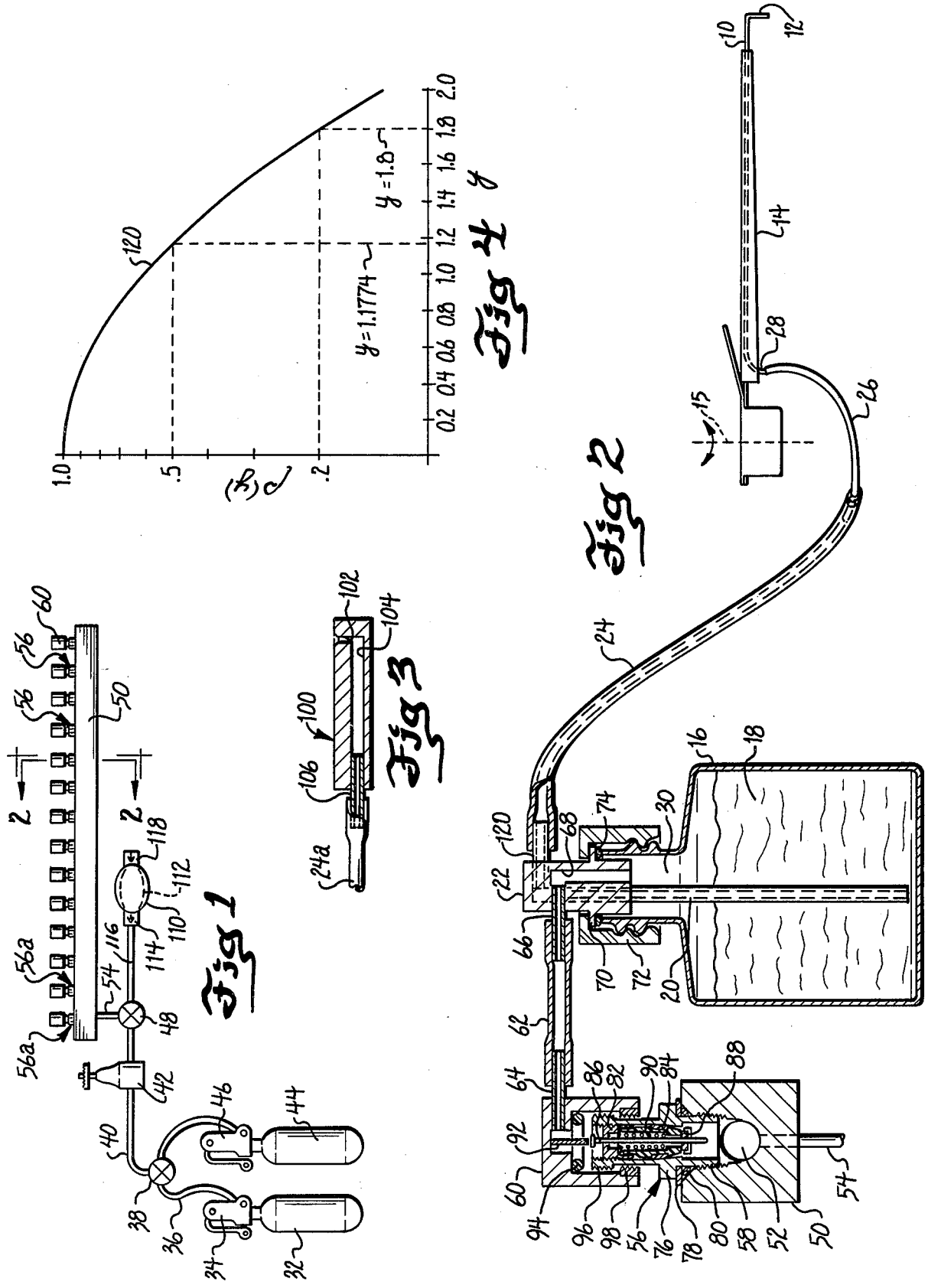

INKING SYSTEM WITH SATURATION CONTROL MEANS FOR MULTI-PEN RECORDERS

The present invention relates to multi-pen recorders, and, more particularly, to a new and improved inking system for multi-pen recorders of the gravity-fed capillary type.

While various types of pressurized inking systems have been heretofore proposed in which the ink to a number of recorder pens is continuously pressurized, these systems have suffered from the disadvantage that the ink pen nib or tip must be pressed against the chart paper with a substantial force to prevent leakage from the pen tip due to the pressure exerted on the ink supply. This increased pressure increases the friction between the pen tip and the chart paper which not only reduces the lifetime of the pen tip but also slows down the pen's response time and increases the overall hysteresis of the system. Higher driving power which is required to obtain acceptable response times also requires a more powerful pen servo motor with a suitable feedback system.

As a result of these disadvantages many multi-pen recorders of the present day are of the gravity-fed capillary tube type and employ separate ink bottles for each pen. However, in these gravity-fed multi-pen systems some form of priming means is required for each ink supply to establish the initial flow of ink to each pen tip or to force ink through the tube in the event it becomes clogged. Previously, a rubber bulb, piston and cylinder, or bellows type arrangement has been used on the ink bottle cap of each of the ink bottles in a multi-pen gravity-fed capillary type recording system. In these arrangements it was easy for the ink bottle to become jostled and ink would get into the bulb or pump and then onto the user's hands. Also, with the pump located on the ink bottle cap there was little room left for a large ink tube since these ink bottle caps are of relatively small dimensions. Accordingly a relatively small diameter flexible tube is usually employed to connect the ink bottle cap with the pen which is mounted on the servo motor, these tubes being customarily 15 or 20 cm in length. These flexible tubes are usually made of a plastic material, which is quite permeable to the solvents in the ink solution. With such a length of thin-walled, small diameter tubing, after a few weeks of non-use of the inking system the dye in the ink would precipitate out and clog the tube.

Examples of various types of prior art inking systems for recorders are shown in the following patents: Hand U.S. Pat. No. 1,849,084; Bowditch U.S. Pat. No. 2,727,802; Cannon U.S. Pat. No. 2,800,385; Holloway U.S. Pat. No. 2,820,689; Dressel U.S. Pat. No. 2,821,919; Summers, Jr., et al. U.S. Pat. No. 3,046,556; Winston U.S. Pat. No. 3,060,429; Gill, Jr., et al. U.S. Pat. No. 3,185,991; Sihvonen U.S. Pat. No. 3,247,519; Behmoras et al. U.S. Pat. No. 3,299,436; Hartai U.S. Pat. No. 3,355,424; Schweitzer U.S. Pat. No. 3,341,860; Sanderson et al. U.S. Pat. No. 3,371,350; Abrams et al. U.S. Pat. No. 3,614,940; Skafvenstedt et al. U.S. Pat. No. 4,053,901; and Brown Jr. U.S. Pat. RE. No. 25,692. The following patents are also cited as having general relevance to the present invention: Carter U.S. Pat. No. 626,750; England U.S. Pat. No. 1,907,763; Miller U.S. Pat. No. 2,769,573; Marwell et al. U.S. Pat. No. 3,208,639; and Kirch U.S. Pat. No. 3,418,054.

It is an object, therefore, of the present invention to provide a new and improved ink priming system for a multi-pen recorder of the gravity-fed capillary tube type wherein one or more of the above discussed disadvantages of prior art arrangement is eliminated.

It is another object of the present invention to provide a new and improved ink priming system for a multi-pen recorder wherein means are provided for selectively supplying gas under pressure to any one of the ink reservoirs associated with each recording pen of the recorder.

It is a further object of the present invention to provide a new and improved ink priming system for a multi-pen recorder wherein a manifold common to the recording pens is provided to which gas under pressure is supplied and individual control valves are provided for selectively supplying gas from the manifold to the ink bottle associated with a particular recording pen so as to prime this pen.

It is another object of the present invention to provide a new and improved non-clogging inking system for use in a recorder wherein the ink, which comprises dye in a suitable solvent, is connected to the moveable recorder pen element through a flexible tubular member which is permeable to the ink and has a length such that the concentration of the dye in the ink at the end of the tubular member which is connected to the recorder pen does not exceed its saturation value.

It is a further object of the present invention to provide a new and improved non-clogging inking system for use in a recorder or the like, wherein a flexible tube is employed to connect the ink supply with the recorder pen, said tube being sufficiently short that evaporation of the ink solvent through the walls of the tube is accompanied by diffusion of dye back to the ink supply so the concentration of dye in the ink at the end of the tubular member near the recorder pen does not exceed saturation.

Briefly considered, the present invention relates to an ink priming system for a multi-pen recorder of the gravity-fed capillary tube type in which individual ink bottles are provided for each recorder pen. A gas manifold, common to all of the ink bottles, is connected to each of the ink bottles through a suitable control valve so that gas which is supplied to the manifold under pressure may be selectively applied to any ink bottle to force ink from that bottle out of the corresponding pen to prime it. As soon as the recording pen is primed and the control valve is released, the gas pressure is bled off so that the system thereafter acts as a normal gravity-fed capillary tube recording system. Therefore, during normal usage of the recording pen the ink is not pressurized and hence the pen nib may press relatively lightly on the chart paper and may be driven by a relatively low powered pen motor as compared to conventional pressurized inking systems.

In accordance with the further aspect of the invention, a non-clogging inking system is provided for each recorder pen by utilizing a short length of flexible thin walled tubing to supply ink to the moveable recording pen element. The length of this permeable, thin walled tube is sufficiently short that evaporation of the ink solution through the walls of the tube is accompanied by diffusion of the dye back to the ink bottle so that the concentration of dye in the ink at the end of the tubular member which is connected to the recorder pen does not exceed saturation value. As a result, the recorder pen may remain motionless for long periods of time without causing precipitation of the dye and clogging of either the tubular member or the recorder pen.

These and other objects and advantages of the present invention will be better understood by reference to the following detailed description and attached drawing wherein:

FIG. 1 is a diagrammatic view of the inking system of the present invention;

FIG. 2 is a sectional view taken along the line 2—2 of FIG. 1 and showing additionally the ink bottle and tubing connection to the recorder pen for one channel of the multi-channel recorder system;

FIG. 3 is a sectional view of an attachment which can be used with the system of FIG. 1; and FIG. 4 is a graph which is useful in describing the non-clogging feature of the present invention.

Referring now to the drawings, the ink priming system of the present invention is therein illustrated with one channel of the multi-pen recorder system being shown in detail. More particularly, the capillary tube pen element 10, which comprises a metal tube having an extremely small diameter hole therethrough, is provided with a nib portion 12 which is adapted to engage the chart paper. The recording element 10 is mounted in a light-weight metal frame 14 which is secured to a suitable galvanometer type pen motor (not shown) so that the element 10 is rotated about the axis 15 in accordance with a given input signal, as will be readily understood by those skilled in the art. An ink bottle 16 is provided for each channel of the multi-pen recorder, and the ink 18 within the bottle 16 is normally supplied through the metal tube 20, which is mounted in the cap portion 22, a relatively large diameter thick-walled tubing section 24 and a relatively short, small diameter thin-walled tubing section 26 to the downwardly extending rear end portion 28 of the recording pen element 10.

During normal operation of the recording channel, the space 30 above the ink 18 in the bottle 16 is not pressurized and hence the recording system acts as a conventional gravity-fed capillary type system. However, in accordance with the present invention, a pressurized ink priming system is provided for each of the channels of the multi-pen recorder. More particularly, a suitable gas, such as carbon dioxide, is stored in liquid form in a relatively large disposable bottle 32, the liquid carbon dioxide in the bottle 32 being at a relatively high pressure such as 845 psig. A bottle hold and puncturing device 34 is employed to hold the bottle 32 and supplies carbon dioxide through the tube 36, a manifold valve 38, and the tubing 40 to a pressure regulator 42 which reduces the pressure of carbon dioxide from the bottle 32 to a pressure in the range of from 4 to 10 psig. While other hydrocarbons or halocarbons are available with a lower vapor pressure, which will require a less rugged container 32 and a simpler pressure regulator 42 than when carbon dioxide is employed, carbon dioxide is preferred as a suitable gas from both a fire hazard and an environmental hazard standpoint. A spare carbon dioxide bottle 44 is mounted in the bottle holding and puncturing device 46 and may be selectively utilized in place of the bottle 32 by suitable actuation of the manifold valve 38.

The output of the regulator 42 is supplied through a three-way valve 48 to a gas manifold 50 which is common to all of the recording channels of the multi-pen recorder. More particularly, the manifold 50 comprises a central chamber 52 which extends longitudinally along the length of the manifold 50 and is connected to the valve 48 through the conduit 54. A series of control valves indicated generally at 56 are mounted in the top wall of the manifold 50 and individually communicate with the chamber 52 through the vertical bores 58. Each of these control valves is actuated by means of a depressible top member 60. A flexible tube 62 is employed to interconnect a metal sleeve 64, which is mounted in the cap 60, and a metal sleeve 66, which is mounted in the ink bottle cap portion 22, the sleeve 66 communicating with the space 30 within the ink bottle 16 through the conduit 68 formed in the cap 22. The cap portion 22 is provided with an outwardly extending flange portion 70 which fits within and is engaged by the top wall of an outer cap member 72, a sealing washer 74 being provided on the flange 70 which seals the inner cap member 22 to the upper end of the screw thread portion of the ink bottle 16 so that a pressure seal is provided between the bottle 16 and the cap member 22.

Considering now in more detail the control valve 56, this valve is of the so-called tank valve construction and is similar to a conventional automotive tire valve. More particularly, the valve 56 comprises an outer housing 76 the bottom end of which is threaded into the bore 58, the washer 78 and sealing ring 80 being provided to maintain a tight seal between the housing 76 and the manifold 50. A two-piece valve core 82 is threaded into the upper end of the housing 76 so that a tight seal is effected between the valve core seal 84 and the housing 76. A valve core pin 86 is slidably mounted in the valve core 82 and carries a valve seat seal 88 which is normally biased upwardly into engagement with the bottom end of the valve core 82 by means of the coil spring 90. The depressible cap member 60 is provided with a downwardly extending pin 92 in the top wall thereof so that when the cap 60 is depressed the valve core pin 86 is engaged and depressed and the control valve 56 is opened. As the cap 60 is depressed a sealing member 94 which is mounted in the cap 60 is moved downwardly into engagement with the upper end of the housing 76 to prevent gas supplied to the manifold 52 from escaping to the atmosphere. Accordingly, when the cap 60 is depressed the pressurized carbon dioxide in the manifold 52 is supplied through the valve 56 and the tubing 62 to the space 30 in the top of the ink bottle 16. As a result, the ink 18 is forced outwardly through the tubes 20, 24 and 26 and into the recording pen element 10 so that the recording pen tip 12 is primed.

The cap 60 is depressed by the operator only for a sufficient time to establish the desired capillary ink flow between the bottle 16 and the pen tip 12 after which the cap 60 is released. Normally, the cap member 60 is positioned by means of the spring 90 with the sealing member 94 spaced above the upper end of the housing 76. When the cap 60 is released after an ink priming operation the pressure established in the space 30 of the ink bottle 16 and the spring 90 cooperate to lift the cap 60 so that the pressurized carbon dioxide in the space 30 is bled off through the space between the outer threads 96 on the upper end of the housing 76 and the inner wall of the cap member 60.

In order to retain the cap 60 loosely on the upper end of the valve 56, a threaded insert 98 is secured in the bottom end of the cap 60. Initially, the cap 60 is assembled on the upper end of the valve 56 by threading the insert 98 over the outer threaded portion 96 on the housing 76 so that the cap 60 is loosely retained on the upper end of the valve 56. The tubing 62 may then be connected to the corresponding ink bottle 16.

In order to prevent the leakage of carbon dioxide from the manifold 52 during periods when no recorder pen is being primed, the control valves 56 are preferably of the tank valve type manufactured by the Schrader Div. of Scovill Mfg. Co. which have a leakage rate of less than one nanoliter per second. Since the rest of the ink priming system is only pressurized intermittedly, the corresponding seals do not have to have such a low leakage rate.

Considering now the operation of the ink priming system of the present invention, during periods when the ink priming system is not required, the three-way valve 48 may be moved to the position in which the output of the regulator 42 is blocked so as to discontinue the supply of pressurized carbon dioxide to the manifold chamber 52. This minimizes the chance that one of the control valves 56 may accidently leak and vent all of the carbon dioxide in the bottle 32 to the atmosphere. However, when the ink priming system is to be used, the three-way valve 48 is turned to the position in which the output of the regulator 42 is supplied through the conduit 54 to the manifold chamber 52. When the operator desires to prime a particular one of the recording pens 10, he depresses the corresponding one of the cap members 60 so that the associated control valve 56 is opened and carbon dioxide under pressure is supplied to the ink bottle 16 and a flow of ink is established over the above described path to the pen tip 12. In this connection it will be understood that the conduit 54 may be relatively long so that the carbon dioxide bottles 32, 44, pressure regulator 42, and valves 38, 48 may be positioned in a remote place while the manifold 50 is positioned relatively close to the row of ink bottles 16. Preferably the conduit 54 is made of nylon which is not as permeable to carbon dioxide as other plastic materials. In accordance with a further aspect of the invention, the manifold 50 is provided with one or two auxiliary control valves 56a in addition to the control valves required for each of the ink bottles 16 associated with each recording pen of the multi-pen recorder. These auxiliary control valves may be employed to flush out any one of the recording pens 10 or to blow ink out of the pens. More particularly, the auxiliary control valve may be connected to a bottle 16 which is filled with a suitable solvent rather than the ink 18. The output tube 24a (FIG. 3), which is connected to the bottle of solvent, is then connected to an elbow block indicated generally at 100 which may be of the type shown and described in detail in my co-pending application Ser. No. 867,201, filed Jan. 5, 1978, which is assigned to the same assignee as the present invention. The elbow block 100 is provided with a vertically extending opening 102 in the top wall thereof into which the pen nib 12 may be tightly inserted. The opening 102 is connected to the end of the tube 24a through the conduit 104 and a metal tube 106 which extends out of the block 100. When the auxiliary valve 56a is opened the solvent in the associated bottle 16 is forced through the tube 24a and the conduits 104 and 102 in the block 100 into the end of pen tip 12 so that solvent is fed in the reverse direction through the recording pen 10 and its associated tubing elements 26 and 24 so as to flush out these elements and remove any precipitated dye and/or the like which may remain therein. In this connection it will be understood that the ink bottle 16 is removed from the associated recording pen 10 when such a flushing operation is performed. In the alternative, the bottle associated with one of the auxiliary valves 56a may contain air, in which case ink may be blown from a selected one of the recording pens 10 by placing the pen tip 12 in the opening 102 and opening the corresponding auxiliary control valve 56a. When the valve 56a is opened carbon dioxide under pressure is forced into the bottle of air so that air under pressure is applied to the pen tip 12 and forces the ink in a reverse direction back through the recording pen 10 and the tubes 26 and 24. Such flushing or flowing of air into the recording pens may be utilized, for example, to prepare the recorder for storage, or the like.

In accordance with a further aspect of the invention, a hand pump indicated generally at 110 is provided which may be used to pressurize the manifold chamber 52 during periods when no carbon dioxide bottle 32 is used. More particularly, the pump 110 comprises a rubber bulb 112 with check valves 114 and 118 at either end thereof. The check valve 114 is connected to one end of a long tube 116 the other end of which is connected to the three-way valve 48. In the third position of the valve 48 the tube 116 is connected to the tube 54 which communicates with the manifold chamber 52. When the bulb 112 is squeezed air pressure up to approximately 10 psig can be built up in the manifold chamber 52 and is prevented from escaping by means of the check valve 114. After a suitable pressure has been established in the manifold chamber 52, any one of the control valves 56 may be opened by depressing the cap 60 and air under pressure will be supplied to the space 30 above the ink reservoir 18 so that the corresponding pen 10 is primed in the manner described in detail here before.

In accordance with a further aspect of the invention, the hand pump 110 may be disconnected from the end of the tube 116 and the check valve 118 in the other end of the bulk 112 may be connected to the tube 116. If the tube 112 is then squeezed and released, a vacuum is established in the manifold chamber 52 as the squeezed bulb 112 expands. A vacuum of approximately $-1.5$ psig may be established with such an arrangement. After a vacuum of this level has been established in the manifold chamber 52, depression of any one of the cap members 60 causes the corresponding control valve 56 to open so that the vacuum in the manifold 52 may be used to draw ink out of the corresponding recorder pen 10 and into the ink bottle 16. Such an arrangement may be employed in place of the above described elbow block arrangement to remove ink from the recording pen 10.

In accordance with a further important aspect of the invention, the tube 24 which is connected at its upper end to the right angle end portion 120 of the tube 20 has a relatively large inner diameter and has relatively thick walls so that the solvent which is present in the ink 18 cannot readily evaporate through the walls of the tubing section 24. Preferably the tubing 24 is made of polyvinyl chloride or ethylene vinyl acetate, has an inside diameter of 0.62 inches and an outside diameter of 0.125 inches and may have an inner lining of polyethylene to reduce evaporation. The tubing section 26 is of relatively small inner diameter so it can fit over the capillary tube end portion 28 of the recorder pen 10 and is also flexible enough so it does not restrict movement of the recorder pen during a recording operation. Preferably, the tubing section 26 is also made of polyvinyl chloride and has an inner diameter of 0.023 inches and an outer diameter of 0.046 inches.

In prior art arrangements a tube of the dimensions of the tubing section 26 was connected all the way from the ink bottle 16 to the end portion 28 of the recording pen 10, a distance in some instances of from 15 to 20 centimeters. Such a small diameter tubing was required in prior art arrangements when a rubber bulb was used on the ink bottle cap to prime the recording pens. I have found that when such a long length of small tubing 26 is employed substantial evaporation of the ink solvent occurs through the relatively thin, permeable walls of the tubing when the recorder is not in use and the pen tip 12 is not moving. Since the evaporated solvent had to be replaced by drawing ink from the ink bottle, a relatively large ink current is established, which moves on the order of 10 mm per day, this ink current leaving the ink bottle and moving down the tubing to replace the evaporated solvent. When additional ink is thus drawn out of the ink bottle and into the small diameter tubing the concentration of dye in the tubing is increased and will reach saturation value, at which point the dye will precipitate out and clog the tubing unless some of the dye can diffuse back into the ink bottle. However, I have also found that the dye can diffuse out of such a small diameter tubing at only a rate of approximately 1 mm per day. This means that after a short period of non-use of the inking system the dye will exceed saturation value and will precipitate out and clog a length of tubing in the order of 15 to 20 cm.

In accordance with the present invention, the tubing section 26 is made relatively short and preferably has a length such that evaporation of the ink solvent through the walls of the tubing section 26 is substantially balanced by diffusion of dye back into the adjacent end of the tubing section 24. As stated heretofore, the tubing 24 has a relatively large inner diameter and relatively little evaporation through the thick walls thereof so that the concentration of dye in the ink adjacent the tubing section 26 is substantially the same as in the bottle 16. The ink bottle is thus effectively connected to the end of the short tubing section 26, by employing the large diameter tubing 24, so that dye can diffuse out of the short length of tubing 26 and maintain the ink below saturation value throughout the length of the tubing 26.

Assuming that evaporation of the ink solvent is uniform along the length of the tubing section 26, if the density of the dye divided by the saturation density is designated as "rho", the idealized characteristic 120 shown in FIG. 4 may be computed for the steady-state or equilibrium condition in which the dye concentration is at saturation at the end of the tube 26 adjacent the recording pen portion 28, i.e., Rho (O)=1.0. In FIG. 4 the value "rho(y)" is plotted along the ordinate and y is plotted along the abscissa, where $y = \sqrt{V/LD} \cdot X$. In this formula for y, X is the distance from the pen end of the tubing 26, and D is the diffusion constant for the particular dye molecules which are used in the ink. The quantity L/V for a particular tube can be measured by filling a given length of such tubing with water, plugging both ends and measuring the time required for all of the water to evaporate out of the tubing i.e., the length of tubing divided by the velocity at which ink must enter the tubing to keep it full. For example, with a polyvinyl chloride tubing of the dimensions given above for the tubing 26, a period of from 15 to 20 days is required for all of the water to evaporate out of a length of tubing 20 cm long.

The idealized characteristic 120 can be employed to determine the proper length of tubing 26 for a particular type of tubing and concentration of dye in the ink supply 18. Preferably, the dye in the ink 18 within the bottle 16 has a concentration of 50% of its saturation blackness thus allowing for a substantial increase in concentration before reaching saturation. If the ink 18 has a higher concentration in the bottle 16 the trace is not any blacker but there is less change in concentration before saturation is reached. On the other hand, if a concentration less than 50% is used the trace will become progressively lighter as the concentration is reduced. From the characteristic 120 of FIG. 4 a concentration of 0.5 (50%) gives a value for "y" of 1.1774. The length of tubing 26 which is permitted under the ideal conditions of the characteristic 120 may then be calculated from the formula $X = \sqrt{DL/V} \cdot 1.1774$. On the other hand, if the concentration of the dye in the bottle 26 is 20% (0.2) then the length of tubing 26 may be substantially greater corresponding to a value of "y" in FIG. 4 of 1.8. The value L/V may be obtained, as discussed previously, by measuring the time required to evaporate all of the water out of a given length of tubing through the walls thereof. It should be emphasized that the characteristic 120 in FIG. 4 is based on the ideal situation in which there is equilibrium of the dye concentration distribution and corresponds to a condition in which the concentration of dye at the pen end of the tubing 26 never exceeds the saturation value of 1.0. Since it is not necessary to design an inking system with such rigid requirements, the length of tubing 26 which is actually used may be somewhat longer than that indicated by the characteristic 120 and still provide non-clogging of the tubing 26 during periods of non-use of many months. For example, with a polyvinyl chloride tubing 26 of the dimensions given above, the tubing 26 may have a length of 1.25 inches.

The end of the tube 26 is conveniently secured within the end of the larger tubing 24 by using a suitable glue, such as PVC dissolved in cyclohexanone of cyclohexane, or other suitable glue of the type used with PVC plumbing fixtures. In this connection it is pointed out that a preferred arrangement for supplying ink from the reservoir 18 to the capillary tube end portion 28 would be a conduit having a gradually tapered inner cross-section. However, such a tapered pipe is quite difficult to fabricate on an economical basis. In the alternative, a tapered pipe may be approximated by employing several lengths of tubing having increasingly larger internal diameters so that a stepped conduit of increasingly larger inner diameter is provided in the direction away from the pen portion 28.

While there have been described what are at present considered to be the preferred embodiments of the invention, it will be understood that various modifications may be made therein which are within the true spirit and scope of the invention.

What is claimed as new and desired to be secured by Letters Patent of the United States is:

1. A non-clogging inking system comprising a non-pressurized ink supply including a dye in a suitable solvent, a movable recording pen element in engagement with a medium to which ink is to be supplied, a first flexible tubular member connected to said ink supply and having relatively little evaporation of said solvent through the walls thereof, and a second flexible tubular member connected between said first tubular member and said recording pen, said second member being relatively permeable to said solvent and having a length such that evaporation of said solvent through said second member is substantially balanced by diffusion of dye along the length of said second member as said evaporated solvent is replaced by ink in said first tubular member.

2. A non-clogging inking system comprising a non-pressurized ink supply including a dye in solution at approximately fifty percent of its saturation value, a movable recorder pen element adapted to be engaged with a medium to which ink is to be supplied, and a flexible tubular member connected between said ink supply and said recorder pen, said tubular member being permeable to said ink solution and having a length such that the concentration of the dye in the ink at the end of said member which is connected to said recorder pen does not exceed the saturation value thereof when said recorder pen remains motionless for long periods of time without causing precipitation of said dye and clogging of said tubular member.

3. A non-clogging inking system comprising a non-pressurized ink supply including a dye in solution, a movable recorder pen element adapted to be engaged with a medium to which ink is to be supplied, and a flexible tubular member connected between said ink supply and said recorder pen, said tubular member being permeable to said ink solution and being sufficiently short that evaporation of said ink solvents through the wall of said tubular member is accompanied by diffusion of dye back to said ink supply so that the concentration of the dye in the ink at the end of said tubular member which is connected to said recorder pen does not exceed saturation when the pen is not moved for a substantial period of time.

4. The inking system of claim 3, wherein said tubular member is made of polyvinylchloride.

5. The inking system of either claim 3 or 4 wherein said tubular member has an inside diameter of approximately 0.023 inches and an outside diameter of approximately 0.046 inches.

6. The inking system of claim 3 wherein said ink supply includes an ink bottle and a second tubular member connected between said ink bottle and said flexible tubular member, said second tubular member having a relatively large ratio of volume to internal surface area so that the concentration of ink therein near the end thereof connected to said flexible tubular member is substantially the same as the concentration of the ink in said ink bottle.

7. The inking system of claim 6, wherein said tubular member is flexible and is made of polyvinylchloride.

8. The inking system of either of claim 6 or 7, wherein said second tubular member has an inner diameter of approximately 0.062 inches and an outside diameter of 0.125 inches.

9. The inking system of either of claim 6 or 7 wherein said second tubular member includes a layer of polyethylene to minimize evaporation of ink solvents through said member.

* * * * *